United States Patent [19]

Araki et al.

[11] Patent Number: 4,840,608
[45] Date of Patent: Jun. 20, 1989

[54] TOOTHED BELT

[75] Inventors: Junichi Araki; Nobuhiro Saito; Hidenori Tezuka; Masuhiro Saito, all of Saitama, Japan

[73] Assignee: Honda Giken Kogyo Kabushiki Kaisha, Tokyo, Japan

[21] Appl. No.: 78,789

[22] Filed: Jul. 28, 1987

[30] Foreign Application Priority Data

Jul. 28, 1986 [JP] Japan .................................. 61-175720

[51] Int. Cl.$^4$ ............................................... F16G 1/28
[52] U.S. Cl. ......................................... 474/205; 474/153
[58] Field of Search ............... 474/205, 153, 154, 202, 474/204, 250, 251

[56] References Cited

U.S. PATENT DOCUMENTS

| | | | |
|---|---|---|---|
| 3,756,091 | 9/1973 | Miller | 474/205 X |
| 4,233,852 | 11/1980 | Bruns | 474/153 |
| 4,337,056 | 6/1982 | Bruns | 474/153 |
| 4,403,979 | 9/1983 | Wujick | 474/153 |
| 4,515,577 | 5/1985 | Cathey et al. | 474/205 X |
| 4,586,915 | 5/1986 | Cathey et al. | 474/153 X |
| 4,605,389 | 8/1986 | Westhoff | 474/205 X |

FOREIGN PATENT DOCUMENTS

| | | |
|---|---|---|
| 106694 | 10/1982 | European Pat. Off. . |
| 148645 | 1/1984 | European Pat. Off. . |
| 146224 | 10/1984 | European Pat. Off. . |
| 52-20629 | 6/1977 | Japan . |
| 56-37457 | 8/1981 | Japan . |
| 57-1714 | 1/1982 | Japan . |
| 57-44866 | 9/1982 | Japan . |
| 57-60501 | 12/1982 | Japan . |
| 59-89852 | 5/1984 | Japan . |
| 2092704 | 12/1978 | United Kingdom . |
| 2049872 | 5/1980 | United Kingdom . |
| 2116287 | 1/1983 | United Kingdom . |
| 2159602 | 5/1985 | United Kingdom . |

*Primary Examiner*—Thuy M. Bui
*Attorney, Agent, or Firm*—Lyon & Lyon

[57] ABSTRACT

A toothed elastomeric belt for use in a power transmission system includes teeth having a cross-sectional configuration that includes a cycloidal convex curve that extends from the tooth tip and is smoothly connected to the bottom land between adjacent teeth by an arcuate fillet.

38 Claims, 6 Drawing Sheets

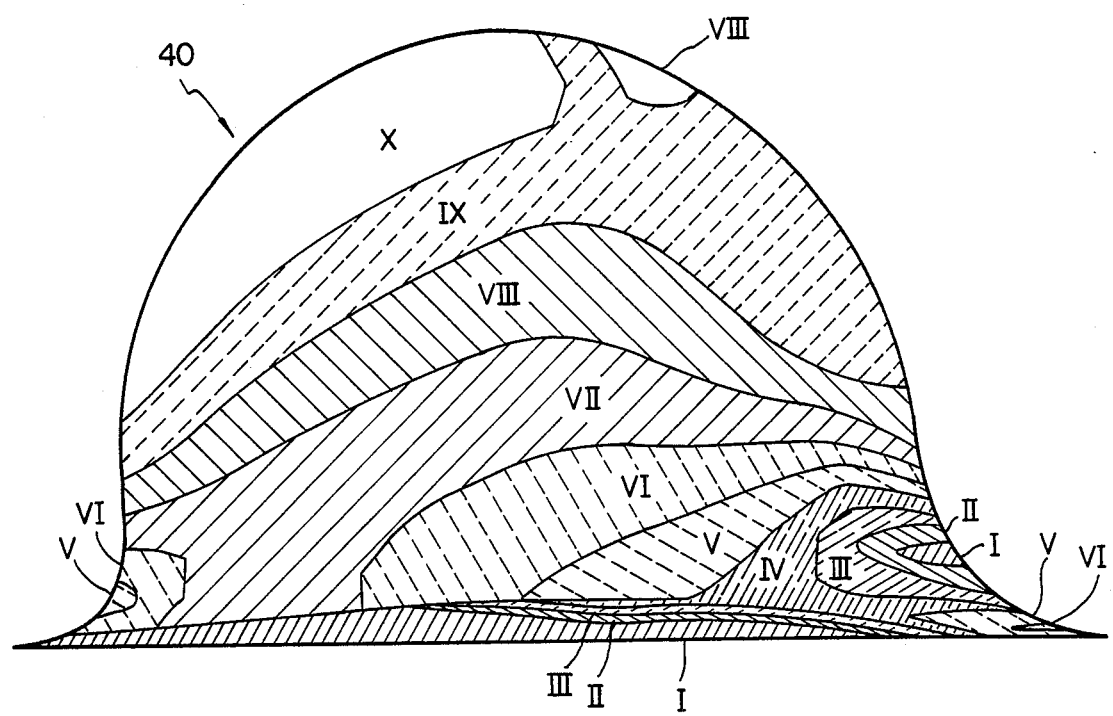
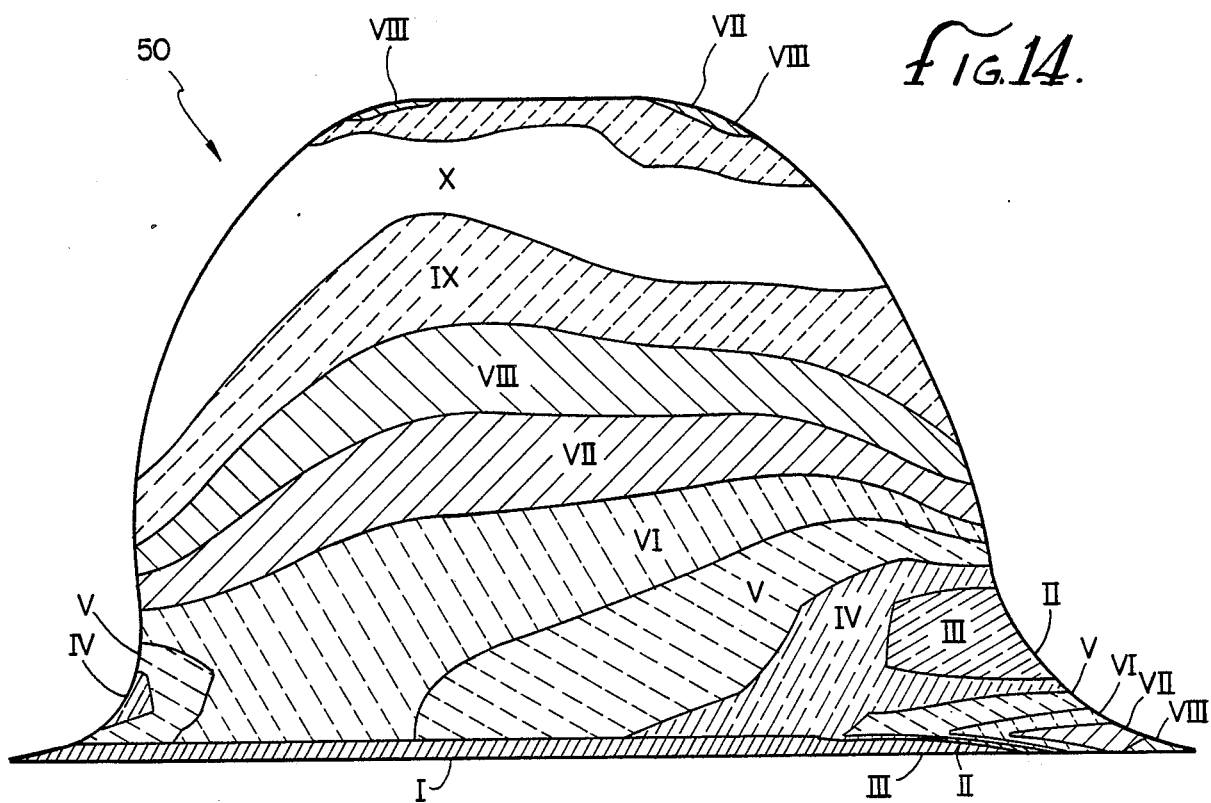

TOOTHED BELT

BACKGROUND OF THE INVENTION

The present invention relates to a toothed belt having a plurality of elastic teeth formed of elastomeric material for meshing engagement with the teeth of a toothed pulley. More particularly, the invention relates to an improved tooth shape for such a toothed belt.

Trapezoid teeth are well known as a tooth shape for a toothed belt which is adapted to be trained around a plurality of toothed pulleys and constitute therewith a power transmitting device. In order to eliminate drawbacks of such trapezoid teeth, there have been proposed tooth shapes as disclosed in Japanese Patent Publication Nos. 52-20629, 56-37457, and 57-44866, Japanese Laid-Open Patent Publication No. 59-89852, Japanese Patent Publication Nos. 57-1714 and 57-60501.

In order for a toothed belt and a toothed pulley, hereinafter simply referred to as a "pulley," to mesh with each other without interference, the following three conditions must be met:

(1) the belt pitch line and the pulley pitch circle must be completely aligned with each other;

(2) the pitches of the toothed belt and the pulley must be completely equally divided, and be identical; and (3) the belt teeth and the pulley teeth must be of such an optimum shape as to allow them to mesh with each other without interference for transmitting power.

The present invention is concerned with the problem indicated as (3) above, as it concerns the toothed belts disclosed in the aforesaid publications. As shown in FIG. 1, a trapezoid tooth 01 is generally used as a belt tooth. Such tooth shape, when it meshes with a pulley tooth 03, contacts the pulley tooth at a root fillet 02. Therefore, the root fillet is subjected to a concentrated stress in the form of shearing stress, and the belt tooth tends to suffer from localized damage.

To overcome this shortcoming, there has been proposed an arcuate tooth 04 which, as shown in FIG. 2, contacts a pulley tooth at a postion near the tooth tip when it meshes with the pulley tooth so that the tooth bears the force in its entirety (see Japanese Patent Publication Nos. 52-20629 and 57-44866). The arcuate tooth 04 can distribute the produced stress into the entire root portion of the tooth, and transmit the load uniformly at the tooth root portion to a load carrying member 05 on the belt pitch line. Consequently, the tooth root portion is less liable to break and is more durable.

There is also known an improved arcuate tooth in which the difference between the tooth shape and its envelope is made as small as possible so as to reduce the backlash of the arcuate tooth. Such a tooth shape is described in Japanese Laid-Open Patent Publication No. 59-89852.

When under low loads, the trapezoid tooth and the improved arcuate tooth are less deforable than the arcuate tooth. When subjected to high loads, however, the trapezoid tooth has been known to jump over the pulley tooth and the improved arcuate tooth has been known to slip against the pulley tooth, resulting in a large deformation. The arcuate tooth, on the other hand, is deformed at high loads to an extent which is substantially the same as that under the low loads.

When a high load is transmitted by a toothed belt, it is the general tendency for the belt to become more elongated; and for the belt teeth to be more deformed and to slip more on the pulley teeth. As a result, proper meshing engagement between the belt and pulley teeth is not effected, and the belt teeth tend to ride over the pulley teeth and are largely deformed.

Such behavior of the belt appears to depend on the pressure angle ($\theta$) and the ratio (H/W) of the height (H) and the width (W) of the tooth shape.

As shown in FIG. 3, it can be assumed that, when a pulley tooth 07 and a belt tooth 06 are in mesh with each other, the force applied from the belt tooth 06 to the pulley tooth 07 at a point A is indicated by P; the coefficient of friction between the teeth by $\mu$; the produced frictional force by F; and the pressure angle by $\theta$. Then, the following equations (1), (2) and (3) are established:

$$P1 = P \cos \theta \tag{1}$$

$$P2 = P \sin \theta \tag{2}$$

$$F = \mu P1 = \mu P \cos \theta \tag{3}$$

In order to satisfy the condition P2< for preventing the meshing teeth from slipping, the following inequality (4) must be met:

$$P \sin \theta < \mu P \cos \theta \tag{4}$$

$$\therefore \tan \theta < \mu \tag{5}$$

If it is assumed here that the coefficient of friction $\mu$ between a steel pulley and a rubber belt having teeth reinforced with woven fabric is 0.25 based on the coefficient of friction $\mu = 0.21$ between a steel pulley and a woven-fabric belt and the coefficient of friction $\mu = 0.30$ between a steel pulley and a rubber belt, then, from inequality (5), $\theta < 14°$. Therefore, in the described example the pressure angle $\theta$ must be smaller than 14 degrees in order to avoid tooth-to-tooth slippage.

Moreover, as shown in FIG. 4, while the belt tooth 06 was restrained on one side, a load (F=1 kg) was applied to the belt tooth 06 on the assumption that no slippage occurs between the teeth, and the belt tooth 06 was checked for the amount of lift ($\delta$) due to deformation thereof. It was found that the amount of lift ($\delta$) varies from tooth shape to tooth shape, and results, as were obtained from these experiments are indicated in Table 1. The differences between the amounts of lift ($\delta$) greatly depend upon the ration (H/W) (see Table 1).

TABLE 1

| | Tooth shape type | | |
|---|---|---|---|
| | Trapezoid tooth | Arcuate tooth | Improved arcuate tooth |
| Pressure angle ($\theta$) | 20.00 | 6.15 | 13.32 |
| Ratio (H/W) | 0.45 | 0.73 | 0.69 |

SUMMARY OF THE INVENTION

The present invention, being based on the foregoing technical background, has an object, to provide a toothed belt which is less deformable under loads; is subject to sufficiently reduced tooth-to-tooth slippage; and is less apt to cause irregular meshing engagement.

The above object can be achieved by a toothed belt having a tooth shape defined by a straight tooth tip line or a tooth tip curve deflected in a direction to increase the tooth height, a cycloidal convex curve joined to the straight tooth tip line or tooth tip curve, and an arc smoothly connecting the cycloidal convex curve and a bottom land.

The tooth shape thus defined is suitable for transmitting high loads since the pressure angle ($\theta$) is small and the ratio (H/W) of the tooth height (H) to the tooth width (W) is large.

For a better understanding of the invention, its operating advantages, and the specific objects obtained by its use, reference should be made to the accompanying drawings and description which relate to a preferred embodiment of the invention.

BRIEF DESCRIPTION OF THE DRAWINGS

FIGS. 9 through 14 are stress distribution diagrams of belt teeth of various shape upon application of load.

DESCRIPTION OF THE PREFERRED EMBODIMENT

Figure 6:
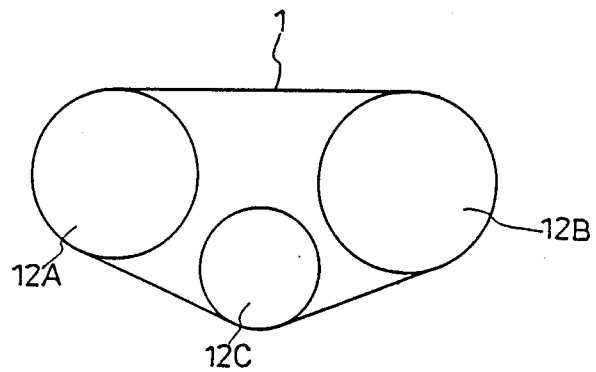
FIG. 6 is a schematic representation of a force transmission system employing a toothed belt of the present invention.
Figure 7:
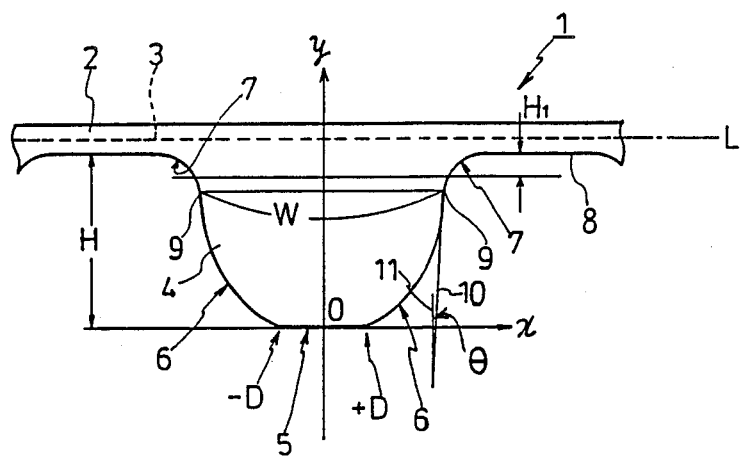
FIG. 7 is a partial elevational view of the toothed belt of the present invention.
Figure 8:
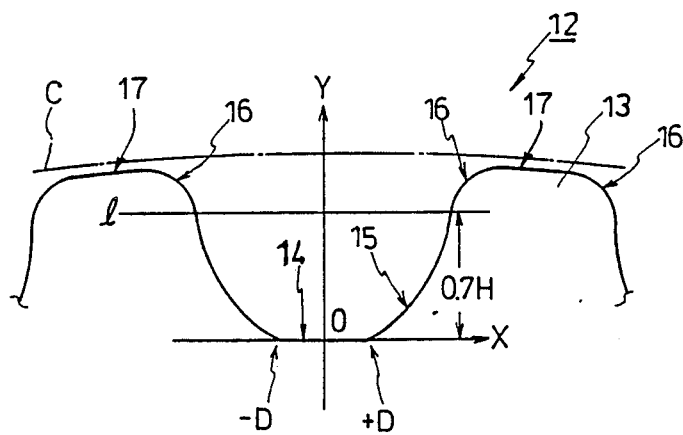
FIG. 8 is a partial elevational view of the toothed belt of FIG. 7 conformed to a cooperating pulley.

With particular reference to FIGS. 6 through 8 there is shown a toothed belt 1 according to the present invention. The toothed belt 1 is trained around a plurality of pulleys 12A, 12B, 12C, as shown in FIG. 6 and has a tooth shape as shown in FIG. 7. The toothed belt 1 is made of an elastomer, such as rubber, and comprises a base layer 2 having a plurality of integral belt teeth 4 and a flexible load carrying member 3 in the form of steel cords, or the like, embedded in the base layer 2. The load carrying member 3 lies on a belt pitch line L. When the belt 1 is trained around a pulley 12, as shown in FIG. 8, the load carrying member 3 is aligned with a pitch circle C of the pulley 12 which lies outside of the tips of the pulley teeth.

The tip or top land 5 of the belt tooth 4 is of a straight-line shape parallel to the belt pitch line L and having a length 2D. Assuming that the central point of the tip 5 is used as an origin O, a straight line passing through the origin O parallel to the belt pitch line L serves as an x axis, and a straight line extending perpendicularly to the x axis at the origin O serves as a y axis, the tooth surface 6 in the shape of a cycloidal convex curve can be defined by the following equations (6) and 7:

$$x = A(1 - \cos \alpha) + D \quad (6)$$

$$y = A(\alpha - \sin \alpha) \quad (7)$$

where A and D are positive constants and $0 \leq \alpha \leq \pi$.

The curve which defines the tooth surface 6 is smoothly joined to an arcuate root fillet 7 which is smoothly joined to a bottom land 8.

A straight line 10 passed through the point 9 of the intersection between the tooth surface 6 and the tooth fillet 7 is tangent to both the cycloidal curve of the tooth surface 6 and the arc of the tooth fillet 7. The straight line 10 crosses a straight line 11 extending parallel to the y axis at an angle ($\theta$) which represents the pressure angle. The tooth has a width (W) as measured between the opposite points 9 of the tooth.

The following Table 2 presents typical dimensions and other relevant comparative data pertaining to toothed belts employing the cycloidal tooth shape of the present invention (column 1), as well as other conventional tooth shapes.

TABLE 2

| Belt | Tooth shape | | | |
|---|---|---|---|---|
| | (1) Cycloidal tooth | (2) Trapezoid tooth | (3) Arcuate tooth | (4) Improved arcuate tooth |
| Pitch (mm) | 9.525 | 9.525 | 9.525 | 9.525 |
| Number of teeth | 88 | — | — | — |
| A | 0.95 | — | — | — |
| D | 0.76 | — | — | — |
| Pressure angle ($\theta$) | 3.50° | 20.0° | 6.15° | 13.32° |
| Tooth width (W) | 5.31 | 4.20 | 5.00 | 5.13 |
| Tooth height (H) | 3.94 | 1.905 | 3.47 | 3.44 |
| Ratio (H/W) | 0.74 | 0.45 | 0.73 | 0.69 |
| Radius of curvature of tooth fillet (H/W) | 0.95 | 0.508 | 0.76 | 1.29 |
| Maximum backlash (mm) | 0.15 | — | 0.14 | 0.05 |
| Maximum backlash position (H1/W) | 0.21 | — | 0.20 | 0.43 |
| Amount of lift ($\delta$) of belt tooth (mm) | 0.8 | 1.8 | 0.9 | 1.2 |

While the top land 5 is shown in FIG. 7 as being of a straight-line shape, it may be defined by a curve deflected in a direction to increase the tooth height.

FIG. 8 fragmentaritly shows a pulley 12 having a plurality of pulley teeth 13 for meshing with the belt teeth 4 of the toothed belt 1. The pulley 12 has a bottom land 14 defined by a straight line having a length 2D. Where a straight line passing through a central point 0 of the straight line of the bottom land 14 and the center of rotation of the pulley 12 is used as the Y axis and a straight line extending perpendicularly to the Y axis at the point 0 serves as an X axis, the straight line of the length 2D defining the bottom land 14 lies on the X axis. A tooth surface 15 joined to the bottom land 14 is defined by a cycloidal convex curve expressed by the following equations (8) and (9):

$$X = 1.1A(1 - \cos \alpha) + D \quad (8)$$

$$Y = 1.15A(\alpha - \sin \alpha) - 0.05 \quad (9)$$

where $0 \leq \alpha \leq \pi$, $0 \leq Y \leq 0.7H$, and A and D are positive constants.

The curve which defines the tooth surface 15 is smoothly joined to an arcuate tooth tip surface 16 at a position indicated by Y=0.5H (see straight line 1), and the tooth tip surface 16 is smoothly joined to a straight tip or top land 17.

The "maximum backlash position (H1/W)" given in Table 2 represents a value that indicates a position, which is spaced a height (H) from the bottom land and where maximum backlash occurs, as the ratio of the height (H1) to the tooth width (W).

Figure 1:
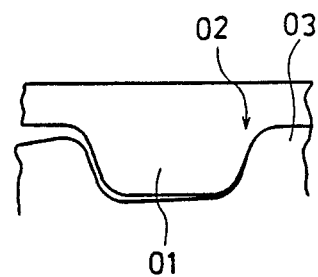
FIGS. 1 and 2 are partial elevational views illustrating two forms of conventional toothed belts.
Figure 2:
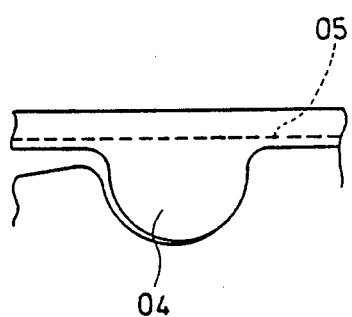
Figure 3:
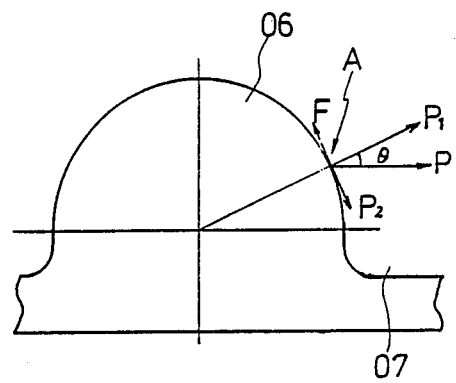
FIGS. 3 and 4 are essentially schematic representations of a toothed belt and pulley arrangement illustrating various aspects of the loadings on the respective members.
Figure 4:
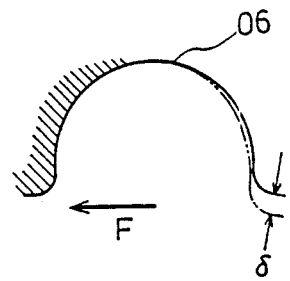
Figure 5:
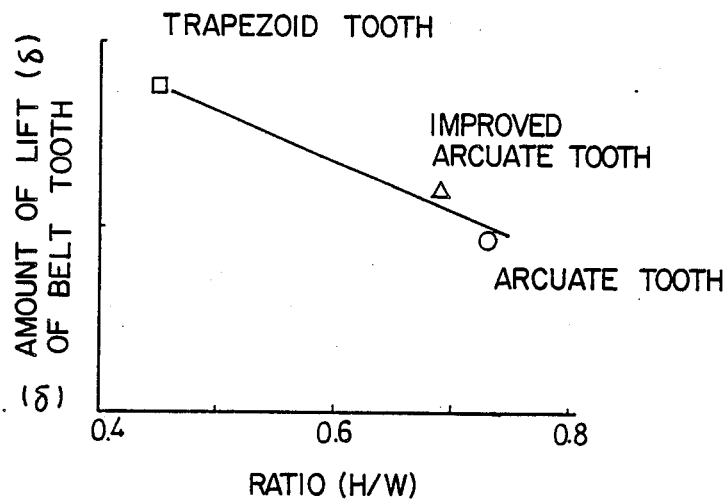
FIG. 5 is a graphical illustration of the lift occurring in belts containing various tooth shapes.

Table 2 shows that the pressure angle ($\theta$) of the tooth shape of the toothed belt 1 according the present invention is 3.50° which meets the condition, $0 < 14°$, and that the tooth shape is much smaller than the other tooth shapes, causing much less tooth-to-tooth slippage. The ratio (H/W) of the tooth height (H) to the tooth width (W) of the belt tooth 4 is sufficiently greater than that of the trapezoid tooth. According to the test method shown in FIG. 4f, the amount of lift ($\delta$) of the belt tooth is 0.8 mm which is smaller than those of the other tooth shapes, so that any irregular meshing engagement is less apt to happen.

Belts having teeth bearing the shape of the present invention were evaluated against belts having teeth of conventional shape according to the following procedures:

(1) Fragmentary portions of toothed belts of rubber (Young's modulus (E)=0.59 kg/mm$^2$) having a trapezoid tooth 30, an arcuate tooth 40, and a cycloidal tooth 50 according to the present invention were prepared.

(2) The above three toothed belts were immovably bonded to a steel plate (Young's modulus (E)=10,000 kg/mm$^2$) serving as a highly elastic body.

(3) The belt teeth were held in mesh with pulleys having corresponding tooth shapes, and while the pulleys were immovably held, the steel plate was moved in the direction of belt pitch lines. The steel plate was displaced an amount a.

(4) In order to obtain a standard for loads to be applied to the belt teeth, a fracture test was conducted on a separately prepared trapezoid tooth 30 according to the method of (3). The trapezoid tooth 30 was broken when the steel plate was displaced by a=45 mm.

Figure 9:
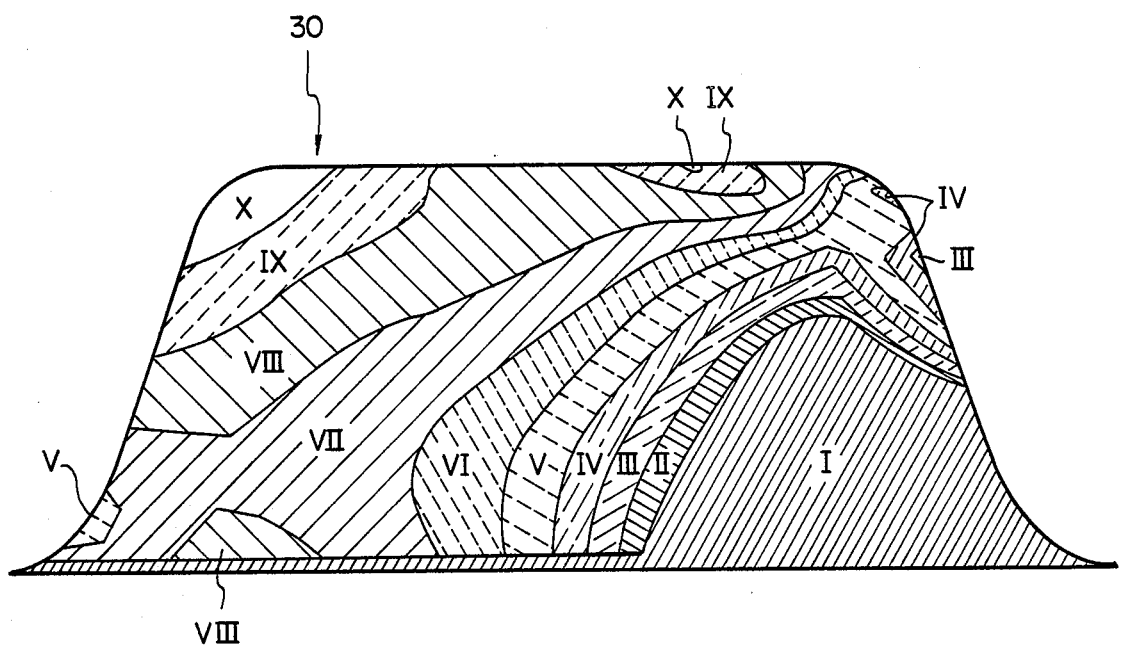
Figure 10:
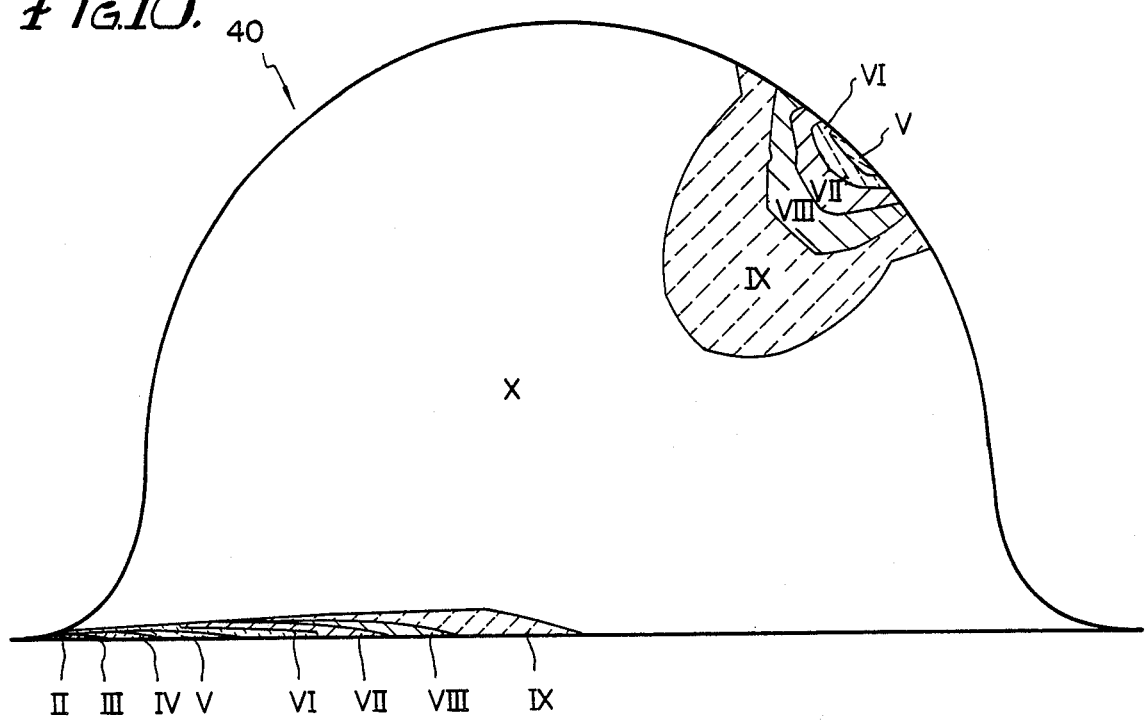
Figure 11:
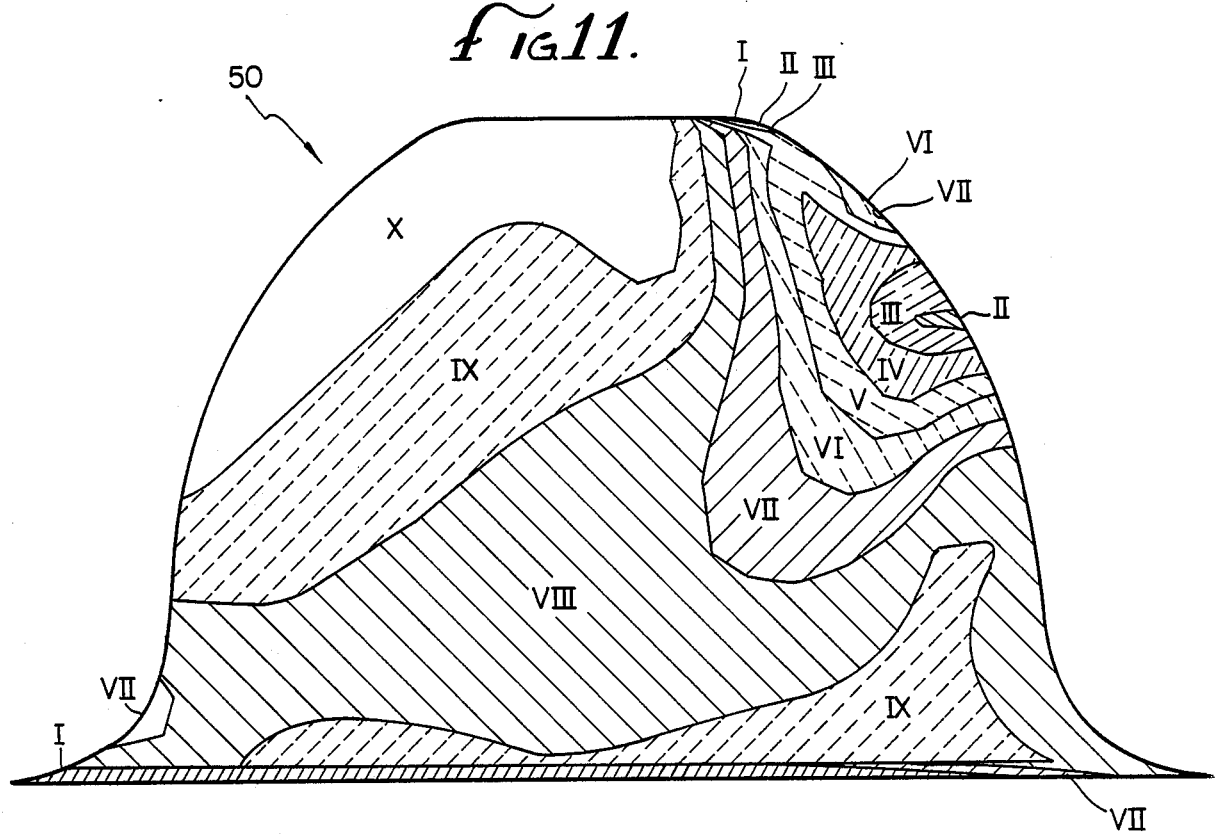

(5) At a first stage, stress distributions were found as von Mises' stresses when the three toothed shapes were displaced by a=0.09(=0.20×0.45) mm, and results were obtained as shown in FIGS. 9, 10 and 11. Stresses produced in regions I, II, III, IV, V, VI, VII, VIII, IX, and X in FIGS. 9, 10 and 11 are given in Table 3.

TABLE 3

| Stress | Region | | | | | | | | | |
|---|---|---|---|---|---|---|---|---|---|---|
| | I | II | III | IV | V | VI | VII | VIII | IX | X |
| $\sigma$ (×10$^{-3}$ kg/mm$^2$) | 4.49 | 3.99 | 3.49 | 1.99 | 2.49 | 1.99 | 1.49 | 0.99 | 0.49 | 0 |

Figure 12:
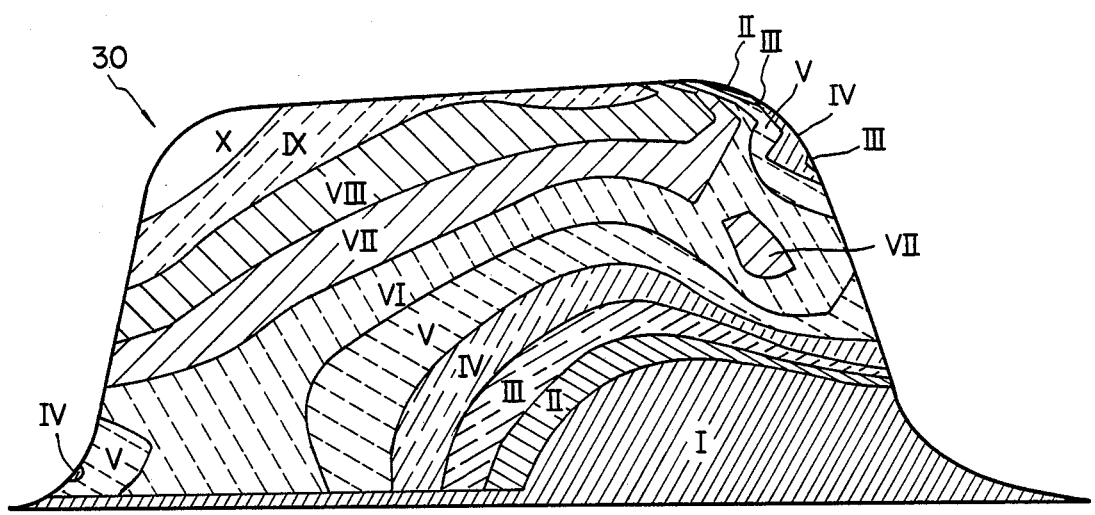

(6) At a second stage, the trapezoid tooth 30 was displaced by a=0.41(=0.912×0.45) mm, whereas the arcuate tooth 40 and the cycloidal tooth 50 were displaced by a=0.45 mm, and produced stress distributions were obtained in the same manner as in (5). Results are shown in FIGS. 12, 13, and 14. Stresses produced in regions I, II, III, IV, V, VI, VII, VIII, IX, and X in FIGS. 12, 13 and 14 are given in Table 4.

TABLE 4

| Stress | Region | | | | | | | | | |
|---|---|---|---|---|---|---|---|---|---|---|
| | I | II | III | IV | V | VI | VII | VIII | IX | X |
| $\sigma$ (×10$^{-3}$ kg/mm$^2$) | 53.9 | 47.9 | 41.9 | 35.9 | 29.9 | 23.9 | 17.9 | 11.9 | 5.9 | 0 |

It follows from FIGS. 9 through 14 that:

(1) the displacement in the first stage corresponds to an initial period (lower-stress state) in which the belt tooth is moved into a position between pulley teeth. The displacement in the second stage corresponds to a subsequent period (higher-stress state) in which a large load is imposed on the belt tooth. The trapezoid tooth 30 develops a large stress-concentrated region in a root fillet where the load is applied at both of the first and second stages. Especially in the second stage, the region I is flattened in shape thus applying a localized large load to the root fillet, which can easily be broken.

(2) In the first stage, the arcuate tooth 40 does not develop a large stressed region, and the load is distributed all over the tooth and uniformly transmitted to the load carrying member. In the cycloidal tooth 50, a very flat, large region I is developed entirely across the root of the tooth, and two regions I or II appear on a tooth tip surface where the load is applied. The cycloidal tooth 50 is therefore subjected to a somewhat larger deformation than the arcuate tooth 40 is. However, each of the tooth shapes 40 or 50 does not produce a high stress in the root fillet where the load is applied, and is far better than the trapezoid tooth 30.

(3) In the second stage, the arcuate tooth 40 develops a small region I in the root fillet to which the load is applied, and the cycloidal tooth 50 develops a region III in the root fillet to which the load is applied although it exhibits a stress distribution similar to that of the arcuate tooth 40. It will be understood from the foregoing that the cycloidal tooth 50 is less subjected to deformation under high loads than the arcuate tooth 40, can uniformly transmit the loads to the load carrying member; is less liable to bring about irregular meshing arrangement; and is highly durable.

As is apparent from the foregoing description, there is provided a toothed belt having a tooth shape defined by a straight tooth tip line or a tooth tip curve deflected in a direction to increase the tooth height and a cycloidal convex curve joining the straight tooth tip line or tooth tip curve and an arc smoothly connecting the cycloidal convex curve to a bottom land.

The tooth shape of the toothed belt is defined by the cycloidal convex curve and has a small pressure angle, so that tooth-to-tooth slippage is less apt to occur. Since the ratio of the tooth height to the tooth width is large, the tooth is less liable to separate from the pulley even when a high load is applied. When a high load is imposed on the tooth, it is distributed throughout the tooth and uniformly transmitted to a load carrying member in the toothed belt. Therefore, there is provided a configuration in which any tooth deformation is small. The tooth is, moreover, highly durable and it has less tendency to cause irregular meshing engagement with an associated pulley.

It will be understood that various other changes in the details, materials and arrangements of parts which have been described and illustrated herein in order to explain the nature of the invention may be made by those skilled in the art within the principle and scope of the invention as expressed by the appended claims.

We claim:

1. A toothed belt for use in a power transmission system, said belt having elastic, longitudinally spaced teeth including a tooth tip with intermediate bottom lands for meshing with cooperating teeth of a toothed pulley, each said belt tooth having a longitudinal sectional shape comprising a cycloidal convex curve extending from the tooth tip and an arc smoothly connecting said cycloidal convex curve and said bottom land.

2. A toothed belt according to claim 1 in which said tooth tip is defined by a straight tooth tip line.

3. A toothed belt according to claim 1 in which said tooth tip is defined by a tooth tip curve deflected in a direction to increase the tooth height.

4. A toothed belt according to claim 1 in which the central point of the tooth tip serves as an origin, a straight line parallel to a belt pitch line as an x axis, and a straight line perpendicular to the x axis as a y axis, and said cycloidal convex curve is expressed by:

$$x = A(1 - \cos \alpha) + D$$

$$y = A(\alpha - \sin \alpha)$$

where A and D are positive constants and $0 \leq \alpha \leq \pi$.

5. A toothed belt according to claim 4 in which said tooth tip is defined by a straight tooth tip line.

6. A toothed belt according to claim 4 in which said tooth tip is defined by a tooth tip curve deflected in a direction to increase the tooth height.

7. A toothed belt according to claim 1 including an elastomeric base layer, a flexible load carrying member disposed on the pitch line of said belt and embedded in said base layer.

8. A toothed belt according to claim 7 in which said tooth tip is defined by a straight tooth tip line.

9. A toothed belt according to claim 7 in which said tooth tip is defined by a tooth tip curve deflected in a direction to increase the tooth height.

10. A toothed belt according to claim 7 in which the central point of the tooth tip serves as an origin, a straight line parallel to a belt pitch line as an x axis, and a straight line perpendicular to the x axis as a y axis, and said cycloidal convex curve is expressed by:

$$x = A(1 - \cos \alpha) + D$$

$$y = A(\alpha - \sin \alpha)$$

where A and D are positive constants and $0 \leq \Delta \leq \pi$.

11. A toothed belt according to claim 10 in which said tooth tip is defined by a straight tooth tip line.

12. A toothed belt according to claim 10 in which said tooth tip is defined by a tooth tip curve deflected in a direction to increase the tooth height.

13. A toothed belt according to claim 7 in which said flexible load carrying member is a plurality of steel cords.

14. A toothed belt according to claim 13 in which said tooth tip is defined by a straight tooth tip line.

15. A toothed belt according to claim 13 in which said tooth tip is defined by a tooth tip curve deflected in a direction to increase the tooth height.

16. A toothed belt according to claim 13 in which the central point of the tooth tip serves as an origin, a straight line parallel to a belt pitch line as an x axis, and a straight line perpendicular to the x axis as a y axis, and said cycloidal convex curve is expressed by:

$$x = A(1 - \cos \alpha) + D$$

$$y = A(\alpha - \sin \alpha)$$

where A and D are positive constants and $0 \leq \alpha \leq \pi$.

17. A toothed belt according to claim 16 in which said tooth tip is defined by a straight tooth tip line.

18. A toothed belt according to claim 16 in which said tooth tip is defined by a tooth tip curve deflected in a direction to increase the tooth height.

19. A power transmission system comprising in combination, a toothed belt according to any one of claim 1-18 and at least one pulley having mating, substantially conjugate teeth.

20. A toothed belt for use in a power transmission system, said belt having elastic, longitudinally spaced teeth including a tooth tip with intermediate bottom lands for meshing with cooperating teeth of a tooth pulley, each said belt tooth having a longitudinal sectional shape comprising a cycloidal convex curve extending from said tooth tip and an arc smoothly connecting said cycloidal convex curve and said bottom land, in which the central point of said tooth tip serves as an origin, a first straight line parallel to a belt pitch line as an x axis, and a second straight line perpendicular to said x axis as a y axis, in which a third straight line passes through a point of intersection between said longitudinal sectional shape comprising a cycloidal convex curve and said arc smoothly connecting said cycloidal convex curve and said bottom land, and is tangent to both said cycloidal convex curve and said arc, so that said third straight line intersects said y axis at an angle $\theta$ of less than 14°.

21. A toothed belt according to claim 20 in which said tooth tip is defined by a straight tooth tip line.

22. A toothed belt according to claim 20 in which said tooth tip is defined by a tooth tip curve deflected in a direction to increase the tooth height.

23. A toothed belt according to claim 20 in which said cycloidal convex curve is expressed by:

$$x = A(1 - \cos \alpha) + D$$

$$y = A(\alpha - \sin \alpha)$$

where A and D are positive constants and $0 \leq \alpha \leq \pi$.

24. A toothed belt according to claim 23 in which said tooth tip is defined by a straight tooth tip line.

25. A toothed belt according to claim 23 in which said tooth tip is defined by a tooth tip curve deflected in a direction to increase the tooth height.

26. A toothed belt according to claim 20 including an elastomeric base layer, a flexible load carrying member disposed on the pitch line of said belt and embedded in said base layer.

27. A toothed belt according to claim 26 in which said tooth tip is defined by a straight tooth tip line.

28. A toothed belt according to claim 26 in which said tooth tip is defined by a tooth tip curve deflected in a direction to increase the tooth height.

29. A toothed belt according to claim 26 in which said cycloidal convex curve is expressed by:

$$x = A(1 - \cos \alpha) + D$$

$$y = A(\alpha - \sin \alpha)$$

where A and D are positive and constants and $0 \leq \Delta \leq \pi$.

30. A toothed belt according to claim 29 in which said tooth tip is defined by a straight tooth tip line.

31. A toothed belt according to claim 29 in which said tooth tip is defined by a tooth tip curve deflected in a direction to increase the tooth height.

32. A toothed belt according to claim 26 in which said flexible load carrying member is a plurality of steel cords.

33. A toothed belt according to claim 32 in which said tooth tip is defined by a straight tooth tip line.

34. A toothed belt according to claim 32 in which said tooth tip is defined by a tooth tip curve deflected in a direction to increase the tooth height.

35. A toothed belt according to claim 32 in which said cycloidal convex curve is expressed by:

$$x = A(1 - \cos \alpha) = D$$

$$y = A(\alpha - \sin \alpha)$$

where A and D are positive cionstants and $0 \leq \alpha \leq \pi$.

36. A toothed belt according to claim 35 in which said tooth tip is defined by a straight tooth tip line.

37. A toothed belt according to claim 35 in which said tooth tip is defined by a tooth tip curve deflected in a direction to increase the tooth height.

38. A power transmission system comprising in combination, a toothed belt according to any one of claims 20–37 and at least one pulley having mating, substantially conjugate teeth.

* * * * *